United States Patent
Park et al.

(10) Patent No.: US 10,528,371 B2
(45) Date of Patent: Jan. 7, 2020

(54) METHOD AND DEVICE FOR PROVIDING HELP GUIDE

(71) Applicant: Samsung Electronics Co., Ltd., Suwon-si, Gyeonggi-do (KR)

(72) Inventors: Da-Eun Park, Seoul (KR); Kyung-Hwa Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 15/201,962

(22) Filed: Jul. 5, 2016

(65) Prior Publication Data
US 2017/0003983 A1    Jan. 5, 2017

(30) Foreign Application Priority Data

Jul. 3, 2015 (KR) .................. 10-2015-0095436

(51) Int. Cl.
*G06F 9/451* (2018.01)
*G06F 3/01* (2006.01)

(52) U.S. Cl.
CPC .............. *G06F 9/453* (2018.02); *G06F 3/013* (2013.01)

(58) Field of Classification Search
CPC .......... G06F 9/453; G06F 21/32; G06F 3/013; G06F 3/0304; G06K 2009/00738; G06K 9/2081
See application file for complete search history.

(56) References Cited

U.S. PATENT DOCUMENTS

| | | | | |
|---|---|---|---|---|
| 5,496,177 A | * | 3/1996 | Collia | G06F 9/453 434/118 |
| 7,100,115 B1 | * | 8/2006 | Yennaco | G06F 9/453 715/748 |
| 7,865,829 B1 | * | 1/2011 | Goldfield | G06F 9/453 715/708 |
| 8,024,660 B1 | * | 9/2011 | Quinn | G06F 9/453 715/745 |
| 9,355,366 B1 | * | 5/2016 | Young | G06N 99/005 |
| 9,934,397 B2 | * | 4/2018 | Calo | G06F 21/6218 |
| 2005/0268234 A1 | * | 12/2005 | Rossi, Jr. | G06F 9/453 715/705 |
| 2009/0243794 A1 | * | 10/2009 | Morrow | G06F 21/32 340/5.52 |
| 2010/0205529 A1 | * | 8/2010 | Butin | G06F 9/453 715/704 |
| 2010/0211875 A1 | * | 8/2010 | Matsushita | G06F 3/0482 715/716 |
| 2011/0154109 A1 | * | 6/2011 | Levine | G06F 8/70 714/26 |
| 2011/0264932 A1 | * | 10/2011 | Park | H02J 3/14 713/310 |
| 2012/0162443 A1 | * | 6/2012 | Allen | G06F 3/012 348/207.1 |

(Continued)

*Primary Examiner* — Justin S Lee
(74) *Attorney, Agent, or Firm* — Jefferson IP Law, LLP

(57) ABSTRACT

A method and apparatus for providing a help guide are provided. The method and apparatus for providing a help guide by an electronic device includes acquiring an image by using a camera, detecting a face from the image, and providing a help guide corresponding to the task being executed, when a user's input is not received with respect to a task being executed while the face is being detected and a predetermined help guide providing condition is satisfied.

14 Claims, 5 Drawing Sheets

(56) References Cited

U.S. PATENT DOCUMENTS

| | | | |
|---|---|---|---|
| 2014/0215250 A1* | 7/2014 | Chen | G06F 1/3231 |
| | | | 713/323 |
| 2014/0280296 A1* | 9/2014 | Johnston | G06F 17/30011 |
| | | | 707/769 |
| 2014/0320920 A1* | 10/2014 | Kitamura | G06F 3/126 |
| | | | 358/1.15 |
| 2014/0351735 A1 | 11/2014 | Armitage | |
| 2015/0042552 A1* | 2/2015 | Tsoref | G06F 3/013 |
| | | | 345/156 |
| 2015/0130716 A1* | 5/2015 | Sridharan | G06F 3/0304 |
| | | | 345/158 |
| 2015/0294098 A1* | 10/2015 | Suwa | G06F 21/32 |
| | | | 726/19 |
| 2018/0121715 A1* | 5/2018 | Woo | G06K 9/00302 |

* cited by examiner

METHOD AND DEVICE FOR PROVIDING HELP GUIDE

CROSS-REFERENCE TO RELATED APPLICATION(S)

This application claims the benefit under 35 U.S.C. § 119(a) of a Korean patent application filed on Jul. 3, 2015 in the Korean Intellectual Property Office and assigned Serial number 10-2015-0095436, the entire disclosure of which is hereby incorporated by reference.

TECHNICAL FIELD

The present disclosure relates to a method and apparatus for providing a help guide for helping a user understand functions of an electronic device.

BACKGROUND

Recently, as electronic devices increasingly provide more various and complicated functions, a user has had difficulty in understanding many of the functions of the electronic devices.

Generally, a method for using functions of the electronic device is provided in such manner that a printed material or a separate menu, which enables the user to identify an electronic manual, is provided. Further, recently, a tutorial service, which enables a user to learn a method for using an electronic device in an interactive manner, has been provided. However, in the case of an existing electronic manual, there is inconvenience in that a user must search through and identify each part thereof in order to obtain desired information. In the case of the tutorial service, there is a problem in that it is difficult to completely understand functions of an electronic device through only a few demonstrations upon first use, and therefore the user should still depend on an existing electronic manual in a situation where a help is really required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for providing a help guide, which can actively provide, to a user, the help guide for helping the user understand functions of an electronic device at a time point when the user needs the help guide.

In accordance with an aspect of the present disclosure, a method for providing a help guide by an electronic device is provided. The method includes acquiring an image by using a camera, detecting a face from the image, and providing a help guide corresponding to the task being executed, when a user's input is not received with respect to a task being executed while the face is being detected and a predetermined help guide providing condition is satisfied.

In accordance with an aspect of the present disclosure, an electronic device or apparatus for providing a help guide is provided. The electronic device includes a display unit, a camera unit, and a controller (processor) that acquires an image by using the camera unit, detects a face from the image, and performs a control to provide a help guide corresponding to the task, when a user's input is not received, with respect to a task being executed, while the face is being detected and a predetermined help guide providing condition is satisfied.

Another aspect of the present disclosure is to provide a method and device for providing a help guide, thereby actively providing, to a user, a help guide for helping the user understand functions of an electronic device at a time point when the user needs the help guide.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
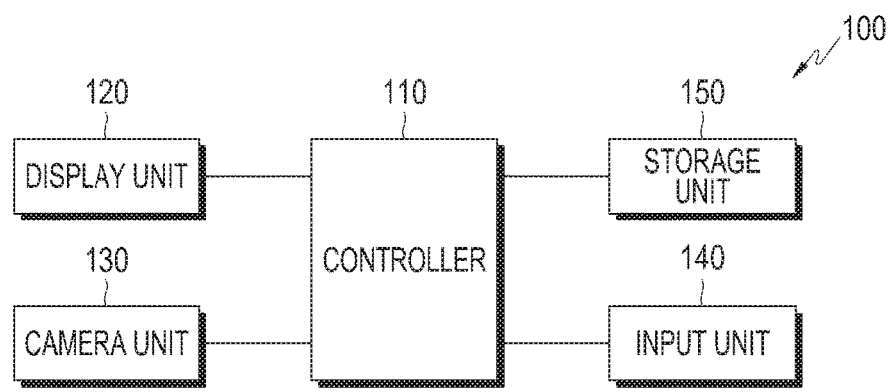
FIG. 1 is a block diagram illustrating an internal configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram illustrating an internal configuration of an electronic device according to an embodiment of the present disclosure.

Referring to FIG. 1, an electronic device 100 for providing a help guide according to an embodiment of the present disclosure may include a controller 110, a display unit 120, a camera unit 130, an input unit 140, and a storage unit 150.

The display unit 120 may include, for example, a liquid crystal display (LCD), a light-emitting diode (LED) display, an organic light-ED (OLED) display, a micro-electro-mechanical systems (MEMS) display, and an electronic paper display. The display unit 120 may display various types of contents (for example, text, images, videos, icons, or symbols) to a user. The display 120 may include a touch screen and receive, for example, a touch, gesture, proximity, or hovering input using an electronic pen or the user's body part.

According to various embodiments of the present disclosure, the display unit 120 may display a service execution screen according to the execution of various applications, and a help guide for helping the user understand functions of an electronic device or various applications may be displayed according to a control of the controller 110.

The camera unit 130 is a device which may photograph a still image and a dynamic image. According to an embodiment, the camera unit 130 may include one or more image sensors (for example, a front sensor or a back sensor), a lens, an image signal processor (ISP) or a flash (for example, LED or xenon lamp). The camera unit 130 may include a plurality of cameras and all of the plurality of cameras may be used. However, according to an embodiment of the present disclosure, it is desirable to acquire an image by using a front camera located on the same surface as the display unit 120. According to various embodiments of the present disclosure, the camera unit 130 may be used to acquire an image located in front of the display unit 120 and a face may be detected from the image acquired through the camera unit 130.

According to various embodiments of the present disclosure, the camera unit 130 may be used in recognizing a person's iris and the movement of the iris, instead of the front image, and may detect whether the person's line-of-sight is directed toward the display unit 120 or which location of the display unit 120 the person's line-of-sight is focused on. Here, a technology of recognizing the movement of the iris and determining the location of the line-of-sight, through the camera unit 130, belongs to the prior art and therefore a detailed description on the technology will be omitted.

The input unit 140 may include, for example, a touch panel, a (digital) pen sensor, a key, or an ultrasonic input device. The touch panel may use, for example, at least one of a capacitive scheme, a resistive scheme, an infrared light scheme, and an ultrasonic scheme. Also, the touch panel may further include a control circuit. The touch panel may further include a tactile layer to provide a tactile reaction to the user. The (digital) pen sensor may be, for example, a part of the touch panel or include a separate sheet for recognition. The key may include, for example, a physical button, an optical key, or a keypad. The ultrasonic input device may detect a micro sound wave in the electronic device 100 through an input tool generating an ultrasonic signal so as to identify data.

According to various embodiments of the present disclosure, the input unit 140 may support the user's input for executing a function or application supporting a particular function.

The storage unit 150 may include a volatile memory and/or a non-volatile memory. The storage unit 150 may store, for example, instructions or data related to one or more other elements of the electronic device 100. The storage unit 150 may store signals or data input/output in correspondence to the operation of the controller 110, the display unit 120, the camera unit 130, and the input unit 140, under a control of the control unit 110. The storage unit 150 may store a control program and applications for a control of the electronic device 100 or the controller 110.

According to various embodiments of the present disclosure, the storage unit 150 may store a help guide for helping a user understand a particular function of the electronic device 100 or a function of an application which is installed and executed in the electronic device 100. The help guide may include help information according to an operation sequence for the execution of a task which is performed by the electronic device 100 or an application installed in the electronic device 100 and may include text, images, and videos. Further, the storage unit 150 may store log data including at least one among: a user input pattern including a user's input response time and the number of input errors by the user with respect to a task being executed by the controller 110; the user's input sequence pattern with respect to the task; and a help guide providing pattern related to a time point when the help guide is provided.

The controller 110 may include one or more of a CPU, an AP, and a communication processor (CP). The controller 110 may process at least some pieces of information acquired from other elements (for example, the display unit 120, the camera unit 130, the input unit 140, the storage unit 150, and the like) of the electronic device 100 and provide the at least some pieces of information to the user by using various methods.

According to various embodiments of the present disclosure, the controller 110 may generally control all the elements of the electronic device 100. Particularly, the controller 110 may acquire an image by using the camera unit 130, detect a face from the acquired image, and, when a user's input is not received, with respect to a task being executed, while the face is being detected and a predetermined help guide providing condition is satisfied, perform a control to provide a help guide corresponding to the task, thereby actively providing, to a user, a help guide for helping the user understand a function of a task being executed by the electronic device 100 at a time when the user needs the help guide.

The controller 110 may acquire an image by using the camera unit 130. At this time, the camera unit 130 may acquire an image located in front of the display unit 120 by using a front camera located on the same surface as the display unit 120. The controller 110 may detect a face from the image acquired through the camera unit 130. For example, the controller 110 may detect a face from the acquired image by using a usual face recognition method and may use a face recognition technology using the outline of the face, the color and/or texture of face skin, a template, etc. According to various embodiments of the present disclosure, the controller 110 may track a user's line-of-sight from the image acquired through the camera unit 130. For example, the controller 110 may model the shape of an eyeball by using information such as the twinkling of the user's iris, pupil, or cornea from the acquired image, thereby determining and tracking the user's line-of-sight. Through the tracking of the user's line-of-sight, the controller 110 may detect which location of the display unit 120 the user's line-of-sight is focused on. In other words, the controller 110 may track the user's line-of-sight and detect, from a screen being displayed on the display unit 120, whether the user's line-of-sight is focused on the user's input location for the execution of a task performed by the electronic device 100 or an application.

The controller 110 may determine whether a face is detected through the camera unit 130 and may determine whether the user's input is received with respect to a task, which is being executed, while the face is being detected. When a user's input is not received, with respect to a task being executed, while the face is being detected and a predetermined help guide providing condition is satisfied, the controller 110 may perform a control to provide a help guide corresponding to the task. For example, the controller 110 may predetermine, as the help guide providing condition, a time during which a task is executed by the electronic device 100 or an application and a user's input is not received, with respect to a task being executed, while the face is being detected. If the user's input is not received during the time predetermined as the help guide providing condition, the controller 110 may determine that the help guide providing condition has been satisfied, and provide a help guide corresponding to the task.

According to various embodiments, the help guide providing condition may be set on the basis of a predetermined time at which an operation mode enters a power saving mode which can reduce the power consumption of the electronic device 100. Here, the power saving mode may be understood as various modes, such as a down-clocking mode which slows down an operation clock of the controller 110 to an operation mode which can reduce the power consumption of the electronic device 100 or a dimming mode which limits the brightness of the display unit 120. For example, if a user's operation is not generated during the predetermined time, the power saving mode may include a dimming mode (a first power saving mode) which limits the brightness of the display unit 120 or a lock screen mode (a second power saving mode) which turns off the display unit 120 so that a function of a touch screen cannot be used. In other words, if a user's operation is not generated during the predetermined time, the controller 110 may control the operation mode of the electronic device 100 to enter the first power saving mode or the second power saving mode. Further, if a user's operation is not generated during a predetermined first time, the controller 110 may control the operation mode of the electronic device 100 to enter the first power saving mode. After the predetermined first time, if a user's operation is not generated during a predetermined second time, the controller 110 may control the operation mode of the electronic device 100 to enter the second power saving mode from the first power saving mode. A help guide providing condition based on a power saving mode may be classified as a first help guide providing condition. The first help guide providing condition may be set as a time which is a predetermined amount before the predetermined time of entering the power saving mode. For example, when the predetermined time of entering the power saving mode is set as 60 seconds, the help guide providing condition may be set as 55 seconds which is 5 seconds faster than the 60 seconds predetermined as the time of entering the power saving mode. In this case, when a task is executed by the electronic device 100 or an application and a user's input is not received with respect to the task being executed during the 55 seconds which is the first help guide providing condition, while the user's face is being detected, the controller 110 may determine that the first help guide providing condition has been satisfied and provide a help guide corresponding to the task. The first help guide providing condition may be suitable when there is no use history related to a task and thereby log data has not been accumulated. Meanwhile, when a user's face is detected in a situation in which a task is not executed by the electronic device 100 or an application, i.e., a lock screen mode and a user's input for cancelling the lock screen mode is not received, a help guide for cancelling the lock screen mode may be provided.

According to various embodiments, the help guide providing condition may be set on the basis of log data according to a user's operation of the electronic device 100. Here, the log data may be a history of user inputs, an application execution history, a history of providing help guides, etc., stored and managed therein, with respect to the electronic device 100. For example, the log data may include at least one among: a user input pattern including a user's input response time and the number of input errors by the user with respect to a task being executed by the electronic device 100 or an application; the user's input sequence pattern with respect to the task; and a help guide providing pattern related to a time point when the help guide is provided. In other words, the controller 110 may store and manage, as log data, information related to a user's operation, the execution of an application, or the providing of a help guide.

As an example, a help guide providing condition based on log data may be classified as a second help guide providing condition which is based on a help guide providing pattern related to a time point when a previous help guide has been provided. The second help guide providing condition may be identical to a time according to a help guide providing pattern related to a time point when a help guide has been previously provided or may be set as a time faster or slower than a time according to the help guide providing pattern. For example, the help guide providing pattern may be: a time including a recorded time point at which a user herself/himself has requested a help guide because the user has previously had difficulty in executing a task; a time including a recorded time point at which the help guide has been provided under a control of the controller 110; or a time obtained by calculating such a time point, at which a help guide has been provided, on the basis of an average, a minimum, a maximum, etc. For example, when a time according to the help guide providing pattern is 50 seconds, the second help guide providing condition may be set as a time equal to, or faster or slower (±5 seconds) than 50 seconds which is a time of the help guide providing pattern. For example, the second help guide providing condition may be set as 45 seconds, 5 seconds faster than the 50 seconds which is the time of the help guide providing pattern. In this case, when a task is executed by the electronic device 100 or an application and a user's input is not received with respect to the task being executed during the 45 seconds which is the second help guide providing condition, while the user's face is being detected, the controller 110 may determine that the second help guide providing condition has been satisfied and provide a help guide corresponding to the task. The second help guide providing condition may be suitable for a case where there is a use history of a task as a result of the initial use of the corresponding task by the electronic device 100 or an application, but the amount of accumulated data is not large.

As another example, a help guide providing condition based on log data may be classified as a third help guide providing condition which is based on a previous user input pattern. The third help guide providing condition may be set as a time or a number which is identical to a user's input response time according to the previous user input pattern or the number of input errors, or may be set as a time faster or slower than the user's input response time or a number smaller or larger than the number of input errors. For example, the user input pattern may be a user input response time at which a user input for performing a next operation by a user with respect to the task being executing is received or the number of input errors when errors occur in a user input. The user input pattern may be a time or a number obtained by calculating such a user input response time or the number of user input errors on the basis of, for example, an average, a minimum, a maximum, and the like. For example, when the user input response time of the user input pattern is 30 seconds, the third help guide providing condition may be set as a time equal to, or faster or slower (±3 seconds) than 30 seconds which is the user input response time. For example, the third help guide providing condition may be set as 27 seconds, or 3 seconds faster than 30 seconds which is the user input response time. In this case, when a task is executed by the electronic device 100 and an application and a user's input is not received with respect to the task being executed during the 27 seconds which is the third help guide providing condition, while the user's face is being detected, the controller 110 may determine that the third help guide providing condition has been satisfied and provide a help guide corresponding to the task. Further, when the number of the user input errors is 5, the third help guide providing condition may be set as 4 which is smaller than the number of the user input errors. In this case, when a task is executed by the electronic device 100 or an application and the number of input errors is 4, which is the third help guide providing condition, with respect to the task being executed, while the user's face is being detected, the controller 110 may determine that the third help guide providing condition has been satisfied and provide a help guide corresponding to the task. As in the case of a task which has been executed several times but has not been executed recently, the third help guide providing condition may be suitable when the amount of accumulated log data is large but an execution method of the task has been forgotten due to recent non-use of thereof.

When a user input is not received with respect to a task being executed, the controller 110 may provide a help guide corresponding to the task. The help guide is stored in the storage unit 150 and may include help information according to an operation sequence for the execution of the task. Further, the help guide may include text, images, and videos. With respect to a task being executed, the controller 110 may change an operation sequence of the help guide, depending on a user input sequence pattern. When an input sequence, which a user prefers or executes in executing a task, is different from a predetermined operation sequence, the controller 110 may change the predetermined operation sequence to an operation sequence according to the user input sequence pattern.

The controller 110 may store and manage log data according to a user operation in the storage unit 150. The controller 110 may configure, as log data, a user input history, an application execution history, a history of providing a help guide, etc. with respect to the electronic device 100, and store and manage the log data. For example, the controller 110 may store and manage log data including at least one among: a user input pattern including a user's input response time and the number of input errors by the user with respect to a task being executed; the user's input sequence pattern with respect to the task; and a help guide providing pattern related to a time point when the help guide is provided.

Figure 2:
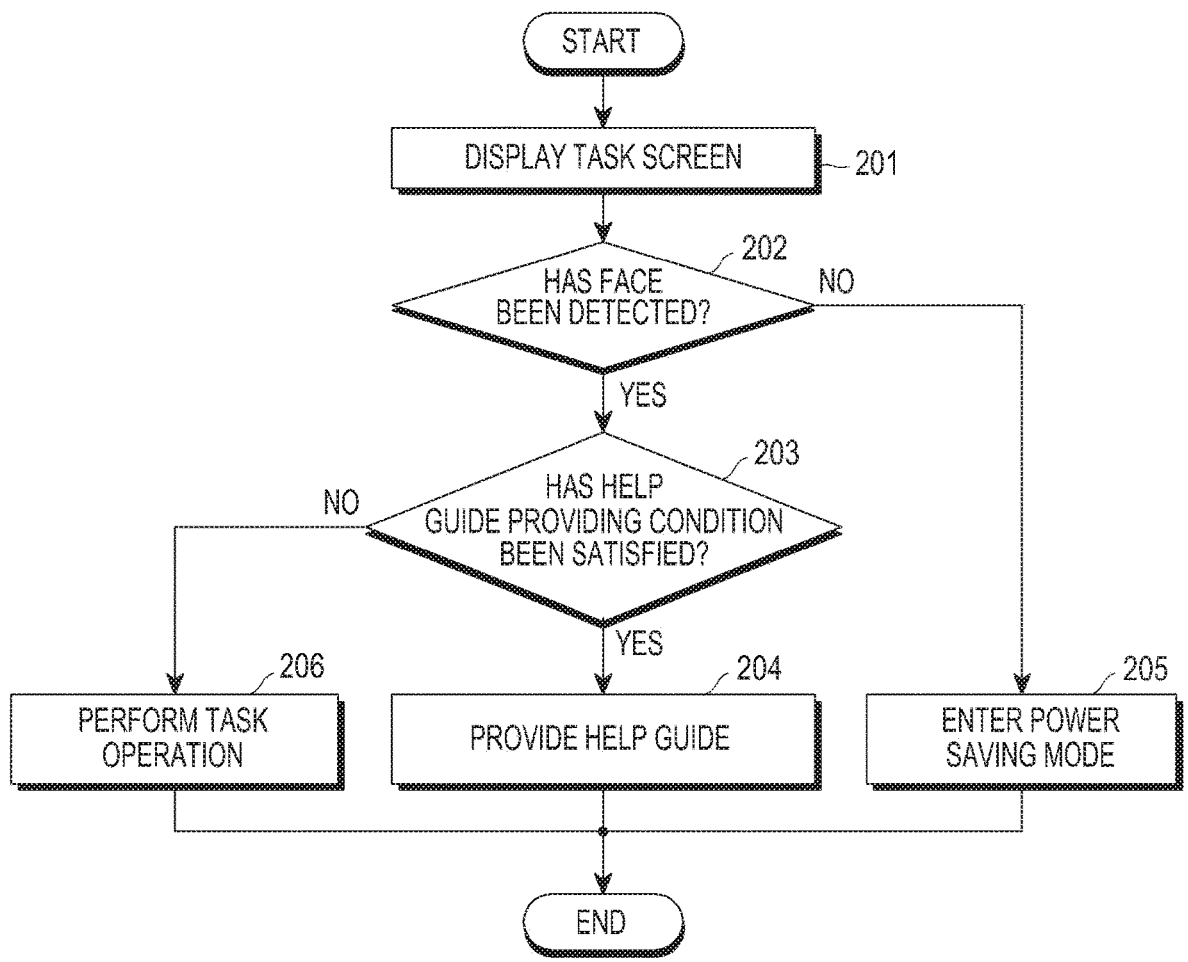
FIG. 2 is a flowchart illustrating a method for providing a help guide according to an embodiment of the present disclosure.

FIG. 2 is a flowchart illustrating a method for providing a help guide according to an embodiment of the present disclosure.

Figure 3:
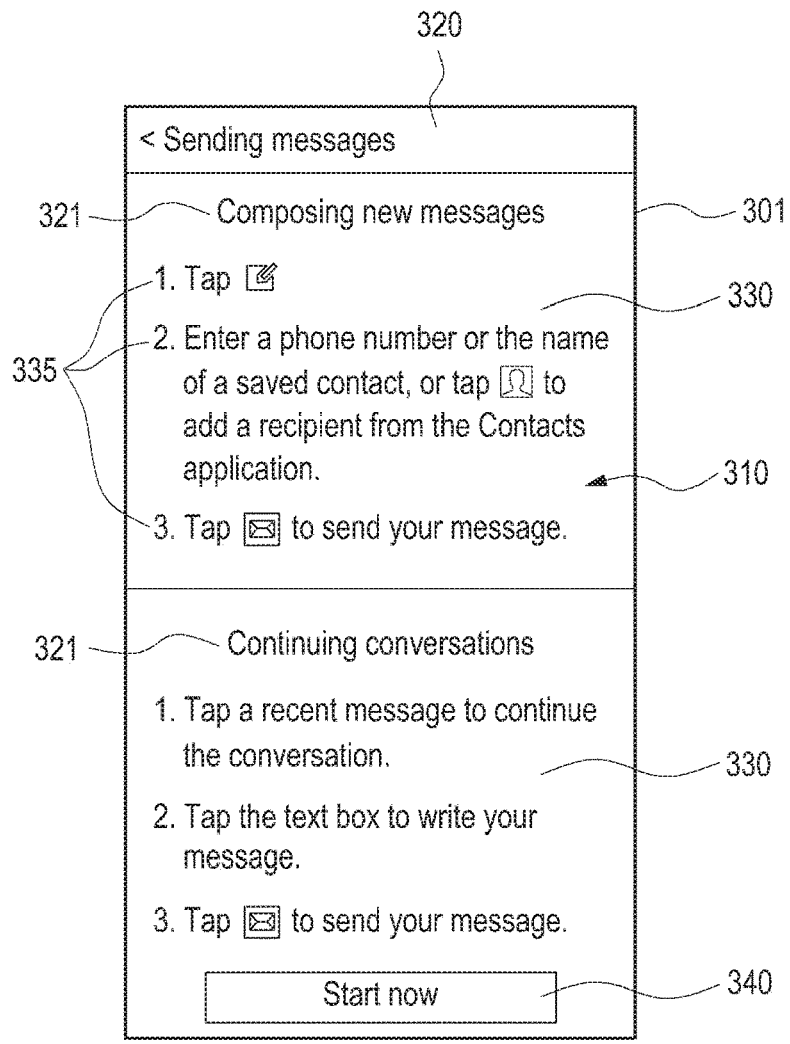
FIG. 3 is a view illustrating a screen that provides a help guide according to an embodiment of the present disclosure.

FIG. 3 is a view illustrating a screen providing a help guide according to an embodiment of the present disclosure.

Figure 4:
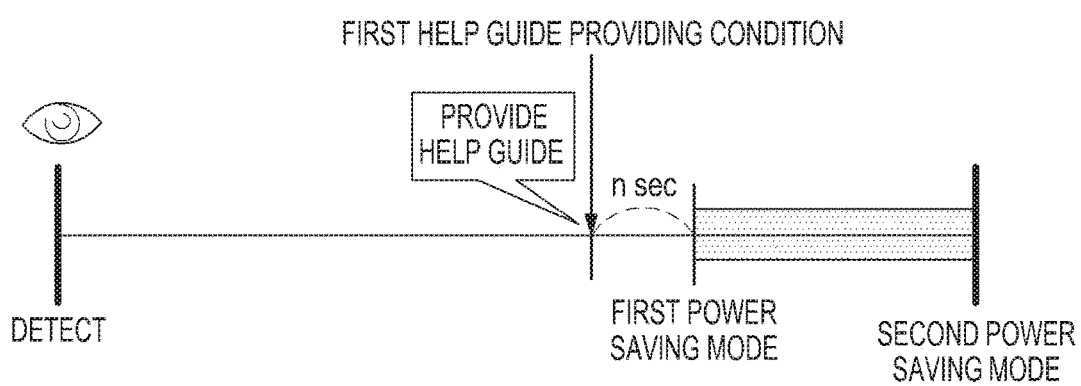
FIG. 4 is a view illustrating a time point when a help guide is provided according to an embodiment of the present disclosure.

FIG. 4 is a view illustrating a time point when a help guide is provided according to an embodiment of the present disclosure.

Hereinafter, a method for providing a help guide according to an embodiment of the present disclosure will be described in detail with reference to FIGS. 2 to 4.

In operation 201, the electronic device 100 may execute a task which is performed by the electronic device 100 or an application installed in the electronic device 100. When the task is executed, an execution screen of the task may be displayed on the display unit 120.

In operation 202, the electronic device 100 may acquire an image by using the camera unit 130 and detect a face from the acquired image. Through this, the electronic device 100 may determine whether a user pays attention to the execution screen of the task displayed on the display unit 120 and determine whether the user has an intention to perform successive operations related to the task being executed. When the user's face is not detected in operation 202, the electronic device 100 may determine that the user has not performed the successive operations related to the task being executed, and may enter, in operation 205, a power saving mode which can reduce the power consumption of the electronic device 100.

When the user's face is selected, the electronic device 100 may determine, in operation 203, that the user has an intention to perform the successive operations related to the task being executed. Then, in order to determine whether help is required to perform the operations related to the task, the electronic device 100 may determine whether the user's input is not received with respect to the task being executed and a predetermined help guide providing condition is satisfied. When, in operation 203, the user's input is received with respect to the task being executed and thus the help guide providing condition is not satisfied, it is determined that the user can perform the task without special difficulties. Therefore, in operation 206, the electronic device 100 may perform a task operation according to the user's input with respect to the task being executed.

When the user's input is not received with respect to a task being executed and thus a predetermined help guide providing condition is satisfied, the electronic device 100 may provide, in operation 204, a help guide corresponding to the task. The help guide may include text, images, and videos to include help information according to an operation sequence for the execution of the task. For example, referring to FIG. 3, a help guide providing screen 310 may be displayed on a screen 301 of the display unit 120 and the help guide providing screen 310 may include a main title 320, which defines a particular operation of a task, and a subtitle 321, which defines a detailed operation of the particular operation. For example, in the case of a help guide related to message transmission, a text of "message transmission" may be displayed in the main title 320 and a text of "new message transmission" or "successive message transmission," as a detailed form of the message transmission, may be displayed in the subtitle 321. Further, help information 330 according to an operation sequence 335, which corresponds to information on each title, may be displayed as text or an image in the main title 320 or the subtitle 321. Further, the help guide providing screen 310 is provided with a reproduction button 340 for reproducing a video about help information.

Further, in the operation 203, the help guide providing condition according to an embodiment of the present disclosure may be set on the basis of a predetermined time at which the electronic device 100 enters a power saving mode which can reduce the power consumption of the electronic device 100. For example, referring to FIG. 4, the power saving mode may include a first power saving mode, which is a dimming mode of limiting the brightness of the display unit 120 and a second power saving mode, which is a lock screen mode of turning off the display unit 120 after the dimming mode. A first help guide providing condition based on the power saving mode may be set as, for example, a time which is a predetermined amount (n secs) before a predetermined time when the display unit 120 should enter the first power saving mode, i.e., the dimming mode. For example, the first help guide providing condition may be set as a time corresponding to n sec with reference to a setting time of the first power saving mode. For example, when a time to enter the first power saving mode is set as 60 seconds and n sec is set as −5 seconds, the first help guide providing condition may be a condition to allow a help guide to be provided if a user's face is detected and the user's input is not received with respect to a task being executed during 55 seconds.

Figure 5:
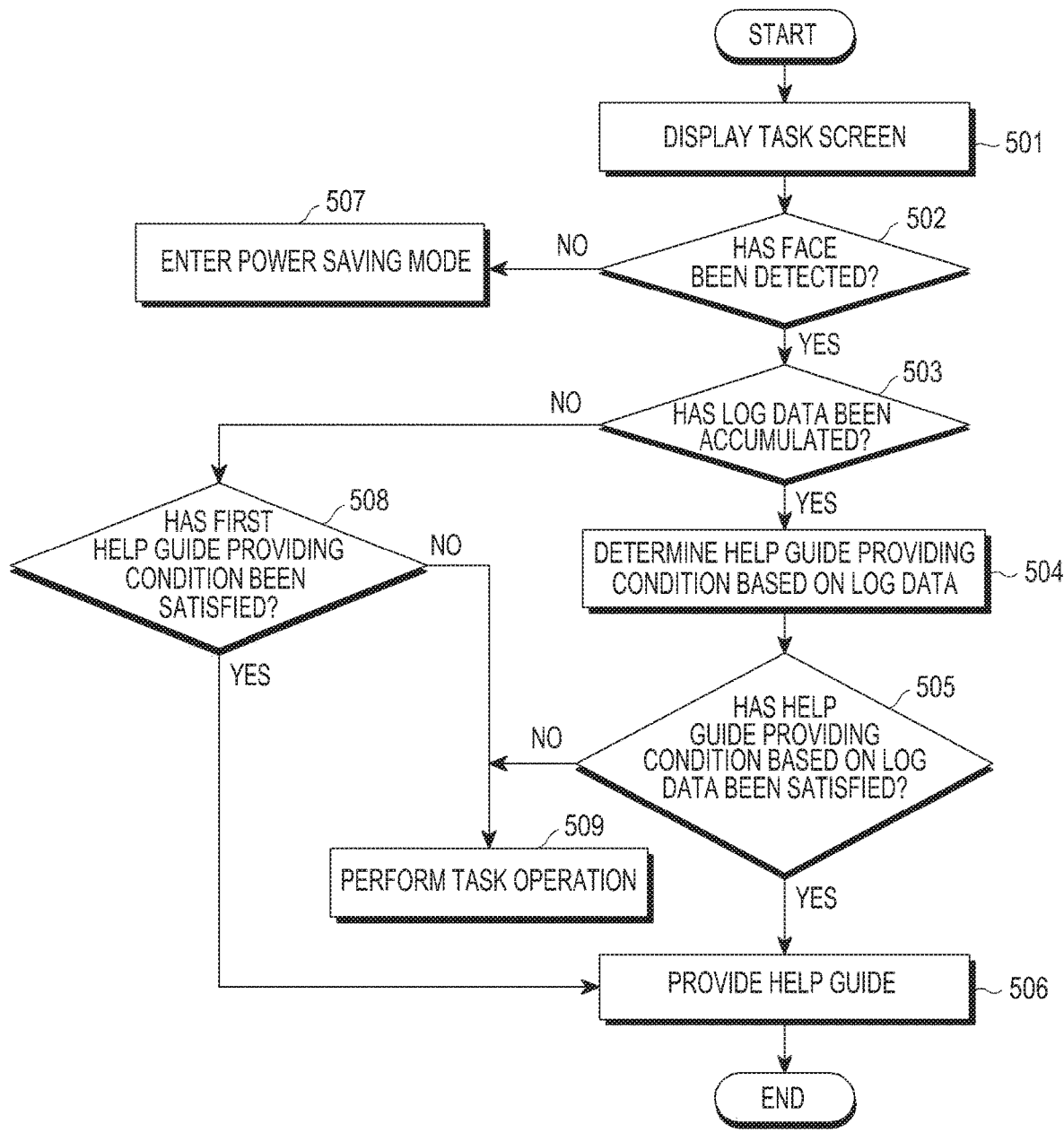
FIG. 5 is a flowchart illustrating a method for providing a help guide according to another embodiment of the present disclosure.

FIG. 5 is a flowchart illustrating a method for providing a help guide according to an embodiment of the present disclosure.

Figure 6:
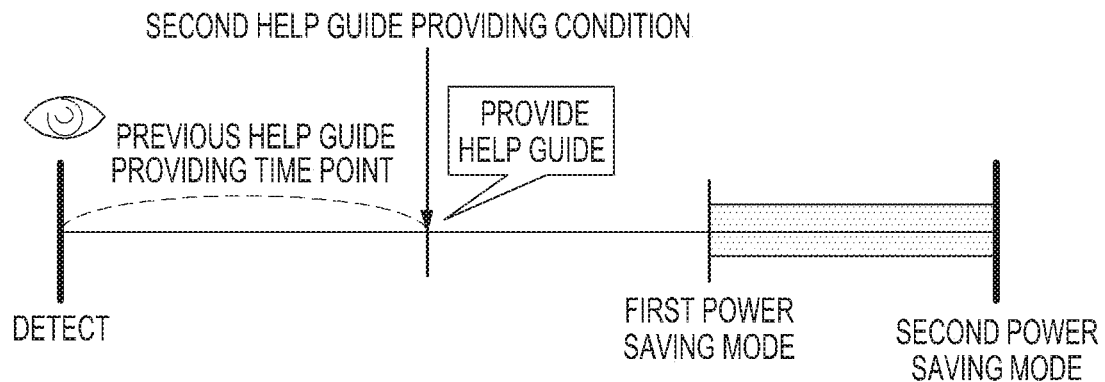
FIGS. 6 and 7 are views illustrating a time point when a help guide is provided according to embodiments of the present disclosure.
Figure 7:
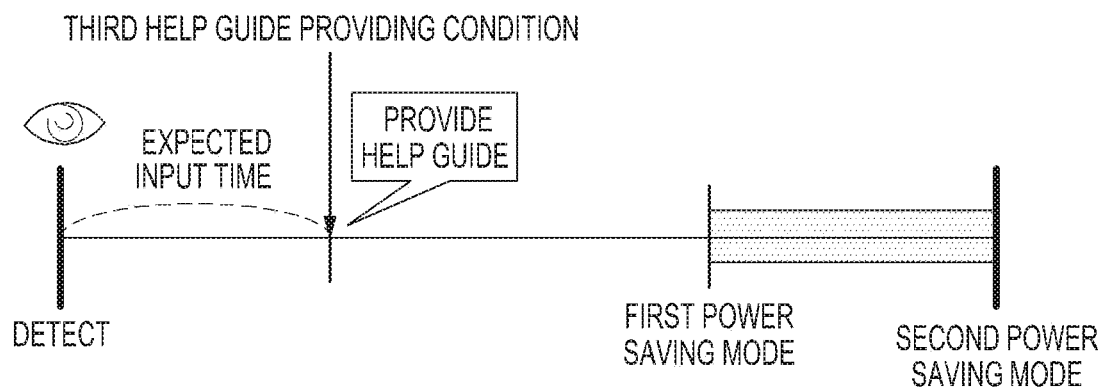

FIGS. 6 and 7 are views illustrating a time point when a help guide is provided according to embodiments of the present disclosure.

Figure 8:
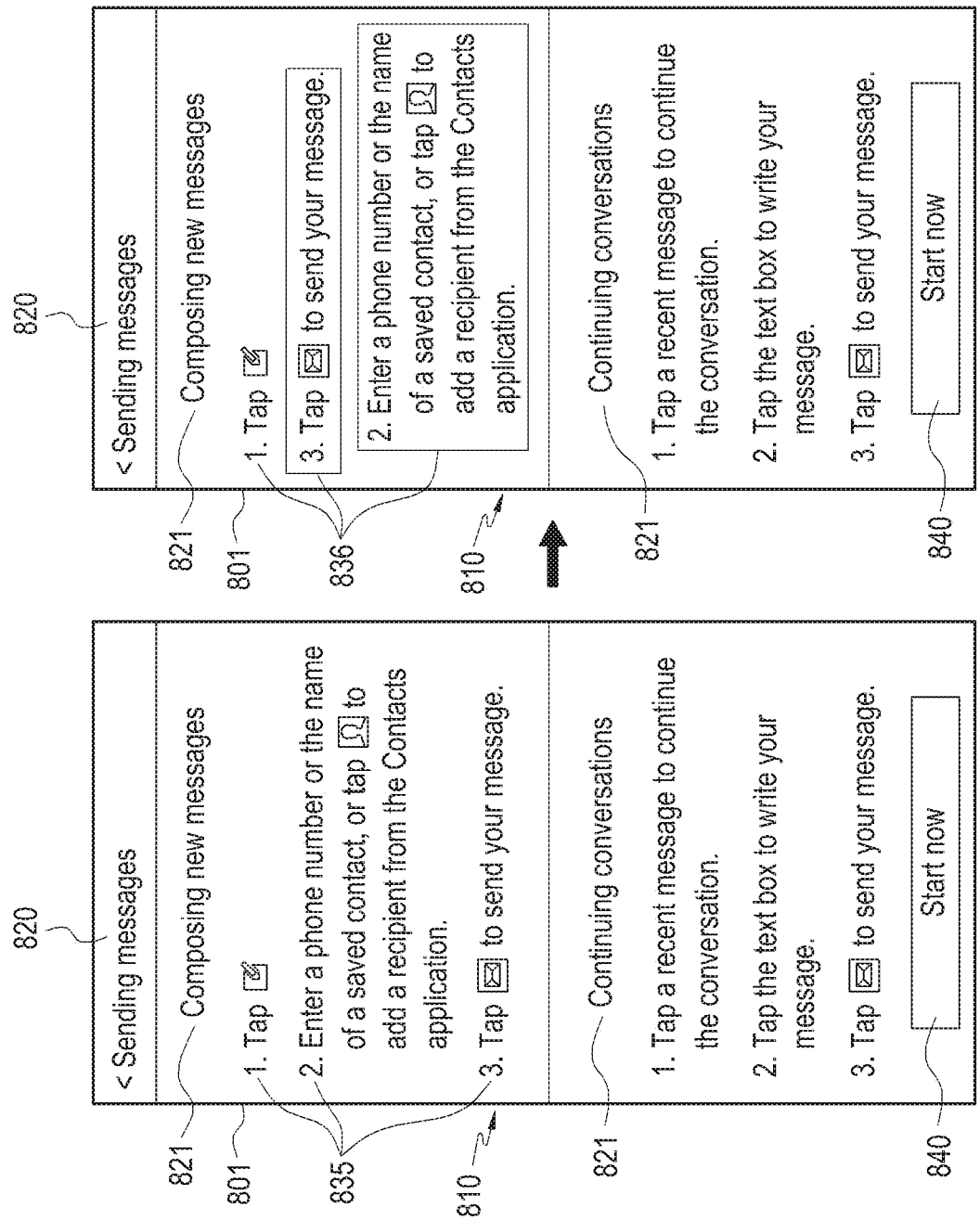
FIG. 8 is a view illustrating a screen which provides a help guide according to another embodiment of the present disclosure.

FIG. 8 is a view illustrating a screen which provides a help guide according to an embodiment of the present disclosure.

Hereinafter, a method for providing a help guide according to another embodiment of the present disclosure will be described in detail with reference to FIGS. 5 to 8.

In operation 501, the electronic device 100 may execute a task which is performed by the electronic device 100 or an application installed in the electronic device 100. When the task is executed, an execution screen of the task may be displayed on the display unit 120.

In operation 502, the electronic device 100 may acquire an image by using the camera unit 130 and detect a face from the acquired image. Through this, the electronic device 100 may determine whether a task is execute by electronic device 100 or application and a user pays attention to the execution screen of the task displayed on the display unit 120, thereby determining whether the user has an intention to perform successive operations related to the task being executed. When the user's face is not detected in operation 502, the electronic device 100 may determine that the user has not performed the successive operations related to the task being executed, and may enter, in operation 507, a power saving mode which can reduce the power consumption of the electronic device 100.

When the user's face is detected, the electronic device 100 may determine, in operation 503, that the user has an intention to perform the successive operations related to the task being executed. Then, in order to determine whether help is required to perform the operations related to the task, the electronic device 100 may determine whether log data according to a user operation is accumulated with respect to the task being executed. When the log data has not been accumulated with respect to a task being executed in operation 503, the electronic device is determined to be in an initial entry state related to the task. In operation 508, the electronic device 100 may determine whether help is required to perform the operations related to the task according to a first help guide providing condition suitable for a case where the log data has not been accumulated.

In operation 504, when log data according to a user operation is determined to be accumulated, the electronic device 100 may analyze the log data and determine a help guide providing condition based on the log data. The determining of the help guide providing condition based on the log data may be classified into, for example, a second help guide providing condition and a third help guide providing condition, according to the accumulation degree of the log data. Here, the log data may be a history of a user's input, an application execution history, a history of providing a help guide, etc. which are stored and managed in the storage unit 150 with respect to the electronic device 100. For example, the log data may include at least one among: a user input pattern including a user's input response time and the number of input errors by the user with respect to a task which is executed by the electronic device 100 or an application; the user's input sequence pattern with respect to the task; and a help guide providing pattern related to a time point when the help guide is provided.

Referring to FIG. 6, a second help guide providing condition based on log data may be set on the basis of a help guide providing pattern related to a time point when a help guide has been previously provided. The second help guide providing condition may be set as a time which is identical to a time according to a help guide providing pattern related to a time point when a help guide has been previously provided or may be set as a time which is faster or slower than a time according to a help guide providing pattern. For example, the help guide providing pattern may be: a time including a recorded time point at which a user himself/herself has requested a help guide because the user has had a difficulty in executing a task; a time including a recorded time point at which a help guide has been provided under a control of the electronic device 100; or a time obtained by calculating such a time point, at which a help guide has been provided, on the basis of an average, a minimum, a maximum, etc. The second help guide providing condition based the log data may be set as, for example, a time corresponding to a time according to a help guide providing pattern. For example, when a time of the help guide providing pattern is set as 50 seconds, the second help guide providing condition may be a condition which allows a help guide to be provided if a user's face is detected and the user's input is not received during 50 seconds with respect to a task being executing. Further, the second help guide providing condition may be set as a time which is faster or slower than the time of the help guide providing pattern. For example, when a time of the help guide providing pattern is set as 50 seconds and the second help guide providing condition is set as −5 seconds or +5 seconds based on the 50 seconds, the second help guide providing condition may be a condition which allows a help guide to be provided if a user's face is detected and the user's input is not received during 45 seconds or 55 seconds with respect to a task being executed.

Referring to FIG. 7, a third help guide providing condition based on log data may be set as a time which is identical to an expected input time according to a user input response time depending on a previous user input pattern or may be set as a time which is faster or slower than the expected input time. According to various embodiments, the number of user input errors may be used as a user input pattern. In this case, when errors occur in user input, the user input pattern may be set as a number which is identical to the number of the input errors, or a number which is smaller or larger than the number of the input errors. For example, the user input pattern may be a user input response time at which a user input for performing a next operation by a user is received or the number of input errors when errors occur in user input. The user input pattern may be a time or a number obtained by calculating the user input response time or the number of user input errors on the basis of an average, a minimum, a maximum, or the like. The third help guide providing condition based the log data may be set as, for example, a time corresponding to an expected input time according to a user input pattern. For example, when the expected input time is set as 30 seconds, the third help guide providing condition may be a condition which allows a help guide to be provided if a user's face is detected and the user's input is not received for 30 seconds with respect to a task being executing. Further, the third help guide providing condition may be set as a time which is faster or slower than the expected input time. For example, when the expected input time is set as 30 seconds and the third help guide providing condition is set as −3 seconds or +3 seconds based on the 30 seconds, the third help guide providing condition is a condition which allows a help guide to be provided if a user's face is detected and the user's input is not received for 27 or 33 seconds with respect to a task being executed. Further, when the number of input errors is used as the user input pattern, the application of the number of input errors is substantially identical to that of the third help guide providing condition, except for converting a time to a number.

In operation 505, the electronic device 100 may determine whether a user input is not received with respect to a task being executed and thus the second or third help guide providing condition determined in operation 504 is satisfied. When, in operation 505, the user input is received with respect to the task being executed and thus the second or third help guide providing condition is not satisfied, it is determined that a user can perform the task without special difficulties. Therefore, in operation 509, the electronic device 100 may perform a task operation according to the user's input with respect to the task being executed.

In operation 506, when a user input is not received with respect to a task being executed and thus the second or third help guide providing condition, determined in operation 504, is satisfied, the electronic device 100 may provide a help guide corresponding to the task.

Meanwhile, in operation 508, the electronic device 100 may determine whether a user input is not received with respect to a task being executed and thus a predetermined first help guide providing condition is satisfied. The first help guide providing condition may be set on the basis of a predetermined time of entering a power saving mode so as to reduce the power consumption of the electronic device 100. This is substantially the same as the embodiment described with reference to FIG. 4. When, in operation 508, a user input is received with respect to a task being executed and thus the first help guide providing condition is not satisfied, it is determined that a user can perform the task without special difficulties. Therefore, in operation 509, the electronic device 100 may perform a task operation according to the user input with respect to the task being executed.

Further, when, in operation 508, a user input is not received with respect to a task being executed and thus the first help guide providing condition is satisfied, the electronic device 100 may provide, in operation 506, a help guide corresponding to the task.

Further, the electronic device 100 may store and manage log data according to a user operation and may change help guide information by using the log data. For example, referring to FIG. 8, a help guide providing screen 810 may be displayed on a screen 801 of the display unit 120 and the help guide providing screen 810 may include a main title 820, which defines a particular operation of a task, and a subtitle 821, which defines a detailed operation of the particular operation. For example, in the case of a help guide related to message transmission, a text of "message transmission" may be displayed in the main title 820 and a text of "new message transmission" or "successive message transmission" which is a detail type of message transmission, may be displayed in the subtitle 821. Further, the main title 820 or the subtitle 821 may be provided with help information corresponding to information on each title according to an operation sequence 835. Further, the help guide providing screen 810 may be provided with a reproduction button 840 for reproducing a video about help information. The electronic device 100 may change, on the help guide providing screen 810, an operation sequence 835 related to help information to an operation sequence 836 having different sequences according to a user input sequence pattern of the log data. In other words, when an input sequence, which a user prefers or executes in executing a task, is different from a predetermined operation sequence 835, the electronic device 100 may change the predetermined operation sequence 835 to the operation sequence 836 according to the user input sequence pattern.

While the present disclosure has been shown and described with reference to various embodiments thereof, it will be understood by those skilled in the art that various changes in form and details may be made therein without departing from the spirit and scope of the present disclosure.

What is claimed is:

1. A method for providing a help guide by an electronic device, the method comprising:
　executing a first application;
　performing a first task through the first application;
　detecting a face from an image acquired by using a camera of the electronic device;
　determining a time point for providing the help guide corresponding to a second task through the first application based on log data of the first application, wherein the log data includes a time difference between a time point of previously performing the first task and a time point of previously performing the second task through the first application, wherein the second task is sequentially performed after the first task; and
　in response to identifying that a user input is not received until the determined time point elapses after performing the first task while the face is being detected, providing the help guide corresponding to the second task.

2. The method of claim 1, wherein the providing of the help guide comprises:
　tracking a line-of-sight from the image acquired by using the camera; and
　in response to identifying that the user input is not received until the determined time point elapses after performing the first task while the face is being detected, providing the help guide corresponding to the second task based on the tracked line-of-sight.

3. The method of claim 1, wherein the log data further includes a number of user input errors with respect to the second task.

4. The method of claim 1, wherein the help guide comprises help information according to a sequence including the second task.

5. The method of claim 4, wherein the sequence is determined according to a user input sequence pattern with respect to the first task.

6. The method of claim 1,
wherein the log data is stored in a memory of the electronic device.

7. An electronic device for providing a help guide, the electronic device comprising:
a camera; and
a processor configured to:
execute a first application,
perform a first task through the first application,
detect a face from an image acquired by using the camera,
determine a time point for providing the help guide corresponding to a second task through the first application based on log data of the first application, wherein the log data includes a time difference between a time point of previously performing the first task and a time point of previously performing the second task through the first application, wherein the second task is sequentially performed after the first task, and
response to identifying that a user input is not received until the determined time point elapses after performing the first task while the face is being detected, provide the help guide corresponding to the second task.

8. The electronic device of claim 7,
wherein the processor is further configured to:
track a line-of-sight from the image acquired by using the camera; and
in response to identifying that the user input is not received until the determined time point elapses after performing the first task while the face is being detected, provide the help guide corresponding to the second task based on the tracked line-of-sight.

9. The electronic device of claim 7, wherein the log data further includes a number of user input errors, with respect to the second task.

10. The electronic device of claim 7, wherein the help guide comprises help information according to a sequence including the second task.

11. The electronic device of claim 10, wherein the processor is further configured to determine the sequence according to a user input sequence pattern with respect to the first task.

12. The electronic device of claim 7, further comprising:
a memory,
wherein the processor is further configured to store the log data in the memory of the electronic device.

13. The method of claim 1, wherein the providing of the help guide comprises displaying a user interface of the help guide on a display of the electronic device.

14. The electronic device of claim 7, further comprising:
a display,
wherein the processor is further configured to control the display to display a user interface of the help guide.

* * * * *